United States Patent [19]

Herget et al.

[11] Patent Number: 5,468,289
[45] Date of Patent: Nov. 21, 1995

[54] SURFACE-MODIFIED PIGMENTS

[75] Inventors: Gerhard Herget; Margarete Herbski, both of Ober-Ramstadt; Karl Osterried, Dieburg, all of Germany

[73] Assignee: Merck Patent Gesellschaft Mit Beschrankter Haftung, Darmstadt, Germany

[21] Appl. No.: 317,581

[22] Filed: Sep. 30, 1994

Related U.S. Application Data

[63] Continuation of Ser. No. 28,867, Mar. 10, 1993, abandoned.

[30] Foreign Application Priority Data

Mar. 11, 1992 [DE] Germany ............... 42 07 723.0

[51] Int. Cl.[6] ............................. C09C 1/28
[52] U.S. Cl. ................... 106/415; 106/417; 106/418; 106/426; 106/442; 106/446; 106/450; 106/454; 106/457; 106/459; 106/468; 106/469; 106/481; 106/483; 106/20 C; 514/844; 428/403; 428/404; 523/200
[58] Field of Search .................. 106/415, 417, 106/418, 442, 446, 450, 481, 20 C, 483, 468, 469, 426, 454, 457, 459; 428/403, 404; 523/200; 514/844

[56] References Cited

U.S. PATENT DOCUMENTS

| | | | |
|---|---|---|---|
| 3,087,828 | 4/1963 | Linton et al. | 106/417 |
| 3,087,829 | 4/1963 | Linton et al. | 106/417 |
| 3,440,075 | 4/1969 | Marshall | 106/415 |
| 3,650,790 | 3/1972 | Klenke et al. | 106/417 |
| 4,828,623 | 5/1989 | Nitta et al. | 106/417 |
| 4,867,793 | 9/1989 | Franz et al. | 106/415 |
| 5,002,608 | 3/1991 | Fujiwara et al. | 106/415 |

FOREIGN PATENT DOCUMENTS

| | | | |
|---|---|---|---|
| 446986 | 9/1991 | European Pat. Off. | |
| 1326901 | 6/1962 | France. | |
| 62-295979 | 11/1987 | Japan. | |
| 1158077 | 6/1989 | Japan | 106/417 |
| 229094 | 3/1990 | Japan. | |
| 416854 | 9/1992 | Japan. | |
| 1268177 | 3/1972 | United Kingdom | 106/415 |

OTHER PUBLICATIONS

Abstract of JP 229,094 (Mar./1990).
Abstract JP 295,979 (Nov./1987).
Abstract of JP 416,854 (Sep./1992).

*Primary Examiner*—Anthony Green
*Attorney, Agent, or Firm*—Millen, White, Zelano & Branigan

[57] ABSTRACT

The present invention relates to surface-modified pigments based on platelet-like substrates which, for improving the settling and redispersion behavior, have been recoated with a mixture comprising two metal oxides selected from the group consisting of silica, alumina and zirconium dioxide.

17 Claims, No Drawings

SURFACE-MODIFIED PIGMENTS

This application is a continuation of application Ser. No. 08/028,867, filed Mar. 10, 1993, abandoned.

BACKGROUND OF THE INVENTION

The present invention relates to surface-modified pigments which, for improving the settling and redispersion behavior, have been recoated with a mixture comprising two metal oxides selected from the group consisting of silica, alumina and zirconium dioxide.

Platelet-like pigments of high density are difficult to handle since the pigments show extensive settling in all liquid media used and can then lead to agglomerations with the formation of a very solid sediment cake. This cake is usually only redispersible with difficulty.

Thus, inter alia, a large number of methods have been developed in order to solve the problem of incorporation and handling of pigments in liquid compositions used.

One possibility of improving this settling behavior is to change the medium used by, for example, adding anti-settling agents or other suitable additives. One of the possibilities is, inter alia, the use of finely divided $SiO_2$, for example aerosol. It is known from DE 3,922,178 to obtain deagglomerated and readily dispersible pigments by mixing a suspension comprising a plate-like substrate with spherical particles, such as, for example, $SiO_2$, $TiO_2$ or $ZrO_2$. The disadvantage of this method is that the final result is in most cases associated with a reduction in luster.

A further possibility of improving the settling behavior is to vary the pigment surface. in DE 2,106,613 (corresponding to U.S. Pat. No. 3,650,790), mica platelets coated with metal oxides are recoated with silica, while recoating using alumina is disclosed in EP 0,446,986. Pigments coated with silicate or with $Al_2O_3$ are difficult to disperse and additionally show losses in luster in printing inks and paint drawdowns.

SUMMARY OF THE INVENTION

Surprisingly, it has now been found that in the recoating of pigments using a mixture comprising two metal oxides selected from the group consisting of silica, alumina and zirconium oxide, the settling behavior of the pigments and, at the same time, the redispersion behavior can be improved without the abovementioned disadvantages being observed.

Accordingly, the invention relates to surface-modified pigments which, for improving the settling and redispersion behavior have been recoated with a mixture comprising two metal oxides selected from the group consisting of silica, alumina and zirconium dioxide.

The invention also relates to a process for the preparation of the surface-modified pigments, in which a mixture of two metal oxides is precipitated onto a platelet-like substrate, characterized in that two water-soluble compounds of silicon, aluminum or zirconium are added to an aqueous suspension of a platelet-like substrate in such a manner that the water-containing oxides are deposited on the substrate and in that the pigment thus recoated is separated off, washed, dried and, if desired, calcined.

Any customary platelet-like substrates can be used for the process, in particular layered silicates and oxides or materials coated with oxides, since they contain reactive OH groups on the surface. Examples of these are, on the one hand, mica, talc, kaolin or other comparable minerals, on the other hand, they also include platelet-like iron oxide, bismuth oxychloride and aluminum platelets or aluminum platelets coated with metal oxide. Mica coated with colored or colorless metal oxides, such as $TiO_2$, $Fe_2O_2$, $SnO_2$, $Cr_2O_3$, ZnO and other metal oxides, by themselves or in a mixture in a uniform layer or in subsequent layers, are particularly suitable for recoating. These so-called pearl luster pigments are disclosed, for example, in German Patent Specifications and Patent Applications 1,467,468, 1,959, 998, 2,009,566, 2,214,545, 2,215,191, 2,244,298, 2,313,331, 2,522,572, 3,137,808, 3,137,809, 3,151,354, 3,151,355, 3,211,602 and 3,235,017 and commercially available, for example under the tradename Iriodin® from E. Merck, Darmstadt.

The process according to the invention is simple and easy to handle. Recoating can take place by coating an already calcined substrate. Recoating is equally effective if it is applied to a substrate which has only been dried but not yet calcined after preparation.

Preferably, recoating is carried out using $SiO_2/Al_2O_3$ or $ZrO_2/SiO_2$ or $ZrO_2/Al_2O_3$ in a single-step process after preparation of the substrate. The recoated pigments are then dried and calcined. This procedure saves intermediate processes.

Preparation of the pigments takes place by mixing the substrates present in aqueous suspension with the coating reagent. The coating reagent is composed of a water-soluble inorganic silicon compound and an aluminum salt or zirconium salt or of a zirconium salt and an aluminum salt. The metal compounds can be metered into the suspension in succession or simultaneously. When $SiO_2/Al_2O_3$ or $SiO_2/ZrO_2$ are used for coating, it is preferred first to add the water-soluble inorganic silicon compound to the aqueous suspension and then to add the aluminum salt or zirconium salt dissolved in water or in solid form. Suitable inorganic silicon compounds are the aqueous solutions of alkali metal silicates which are commercially available under the name "water glass", such as, for example, potassium silicate and sodium silicate. Preferably, sodium silicate is used in recoating. Suitable zirconium salts and aluminum salts are in particular the halides, nitrates and sulfates, preferably the chlorides. Precipitation of the silicon salts, zirconium salts or aluminum salts or the hydroxides or oxides of silicon, zirconium or aluminum, which are deposited on the platelet-like substrates dispersed in the suspension, is effected by suitable pH and temperature conditions.

The conditions necessary for this in each case are known to one skilled in the art and can be taken from relevant textbooks. After precipitation, the recoated pigments are separated off, washed and dried and, if desired, calcined.

The metal oxide content for recoating, relative to the entire pigment is 0.3–50% by weight, preferably 0.5–30% by weight and in particular 1–15% by weight. For recoating, the metal oxides can be mixed with one another in any ratio. Preferably, the $SiO_2/Al_2O_3$ or $ZrO_2/SiO_2$ or $ZrO_2/Al\ O_3$ mixtures are used in a weight ratio of 1:5 to 5:1, particular preference being given to 1:1 and 2:1 mixtures. One of ordinary skill in the art can routinely determine starting material concentrations and relative amounts of metals therein, for a given, desired product content.

The pearl luster pigments recoated by the process according to the invention show delayed settling and improved redispersibility of a sediment formed. The observation that no reduction in luster is observed in the recoated pigments is also surprising.

In particular in the case of pearl luster pigments recoated with $SiO_2/Al_2O_3$, an increase in luster is observed in most cases. The higher the alumina content in the $SiO_2/Al_2O_3$ mixture, the greater the increase in luster. Preference is given to $SiO_2/Al_2O_3$ recoatings using 1:1 and 2:1 mixtures.

The pigments according to the invention are compatible with a large number of color systems, preferably such as varnishes, paints and printing inks Accordingly, the invention also relates to the use of the recoated pigments in formulations such as paints, varnishes, printing inks, plastics and for cosmetics preparation.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications, cited above and below, and of corresponding German No. P 42 07 723.0, are hereby incorporated by reference.

EXAMPLE

Example 1

Coating with 5% of $SiO_2$ for comparative experiments

A pigment suspension comprising 200 g of Iriodin 123 ($TiO_2/SnO_2$ mica having a particle size of 5–20 μm from E. Merck, Darmstadt, Art. No. 4842) in 3 l of water is heated to 60° C. and brought to a pH of 9.0 with 10% sodium hydroxide solution. The sodium silicate solution (diluted with water in a ratio of 1:1; 54 ml dissolved in 1500 ml of water) is slowly metered into the pigment suspension. The pH is kept constant during this addition with 10% hydrochloric acid solution. The mixture is then stirred first at a pH of 9.0 for 15 minutes and at a pH of 6.5 for another 15 minutes. The suspension is heated to 95° C. and stirred at this temperature for 1 hour. It is allowed to cool, the solvent is removed by suction filtration, the product is washed until free of chloride and dried. A portion of the product is calcined at 850° C.

Example 2

Coating with 2.5% of $SiO_2$/2.5% of $Al_2O_3$ (1:1)

Analogously to Example 1, a pigment suspension comprising 200 g of Iriodin 123 in 3 l of water is heated to 60° C. and brought to a pH of 9.0 with 10% sodium hydroxide solution. The sodium silicate solution (diluted with water in a ratio of 1:1; 27 ml dissolved in 750 ml of water) is then metered in. The mixture is stirred for 15 minutes and then brought to a pH of 6.5 with 10% HCl solution and stirred for another 15 minutes. After addition of 23.68 g of $AlCl_3 \times 6H_2O$ and 13.9 g of $Na_2SO_4$, the suspension is heated to 95° C. over a period of 15 minutes and stirred at this temperature for 1 hour. The suspension is allowed to cool, the product is filtered off with suction, washed until free of chloride and dried.

A portion of the modified pigment obtained is calcined at 850° C. for 30 minutes.

Example 3 a) Coating of mica with 1.7% of $SnO_2$ and 55.1% of $TiO_2$ 500 g of mica having a particle size of 5–25 μm in 10 l of water are heated to 75° C. A solution comprising 19.75 g of $SnCl_4 \times 5H_2O$ in 600 ml of water is metered in at a pH of 1.8, and the mixture is then stirred for 5 minutes. 1800 ml of $TiCl_4$ solution (367 g of $TiCl_4$/l of water) are then added, the pH being kept constant with concentrated sodium hydroxide solution. After cooling, the suspension is filtered off with suction, the product is washed until free of chloride and dried at 90° C. A portion of the product is calcined at 850° C. for 0.5 hour.

b) Coating with 2.5% of $SiO_2$/2.5% of $Al_2O_3$ (1:1)

100 g of the dried pigment obtained from Example 3a are suspended in 2 l of water and heated to 60° C. The pH is brought to 9.0 with 10% sodium hydroxide solution. The sodium silicate solution (diluted with water in a ratio of 1:1; 13.5 ml dissolved in 375 ml of water) is then added, and the mixture is stirred for another 15 minutes. The pH is brought to 6.5 with 10% sodium hydroxide solution. After stirring for 15 minutes, first 11.84 g of $AlCl_3 \times 6H_2O$ and then 6.95 g of sodium sulfate in solid form are added. After addition, the suspension is heated analogously to Example 2 and worked up. The product is calcined at 850° C. for 15–30 minutes.

c) Coating with 5% of $SiO_2$/5% of $Al_2O_3$ (1:1)

900 ml of the pigment suspension from a) are diluted with 2 l of water. Coating with sodium silicate solution (diluted with water in a ratio of 1:1; 40.5 ml dissolved in 1125 ml of water), 35.52 g of $AlCl_3 \times 6H_2O$ and 20.85 g of sodium sulfate takes place analogously to Example 3b. The recoated pigment is worked up and dried. A portion of the product is calcined at 850° C. for 30 minutes.

Example 4 a) Coating of mica with 1.7% of $SnO_2$ and 52.6% of $TiO_2$ 500 g of mica (particle size 5–25 μm) in 10 l of water are heated to 75° C. At a pH of 1.8, first the $SnCl_4$ solution (19.75 g of $SnCl_4 \times 5H_2O$ in 600 ml of water) is added, the mixture is stirred for 5 minutes, and then 1700 ml of $TiCl_4$ solution (367 g of $TiCl_4$/l of water) are added. During this addition, the pH is kept constant with concentrated sodium hydroxide solution. The coated mica pigment present in the suspension is directly recoated without workup.

b) Coating with 5% of $SiO_2$ 900 ml of the pigment suspension from a) are diluted with 2 l of water. Coating at 60° C. and pH 9.0 using sodium silicate solution (diluted with water in a ratio of 1:1, 54 ml dissolved in 1500 ml of water) is carried out analogously to Example 1. The recoated pigment is worked up and dried. A portion of the product is calcined at 850° C. for 15–30 minutes.

c) Coating with 5% of $SiO_2$ and 5% of $Al_2O_3$ (1:1)

Coating takes place analogously to Example 2. 100 g of the dried pigment from Example 4a are first suspended in 2 l of water. First sodium silicate solution (diluted with water in a ratio of 1:1; 27 ml made up to 750 ml with $H_2O$) and then 23.68 g of $AlCl_3 \times 6H_2O$ and 13.90 g of sodium sulfate in solid form are added to this solution, and the mixture is stirred at 95°–100° C. for 1 hour. The solution is then allowed to cool, the product is filtered off with suction, washed until free of chloride and dried. A portion of the product is calcined at 850° C. for 30 minutes.

Example 5

Coating with 5% of $SiO_2$ and 2.5% of $Al_2O_3$ (2:1)

Analogously to Example 3, 500 g of mica are coated with 1.7% of $SnO_2$ and 55.1% of $TiO_2$ in aqueous solution. The pigment suspension obtained is heated to 60° C. and brought to a pH of 9 with 10% sodium hydroxide solution. After addition of the sodium silicate solution (diluted with water in a ratio of 1:1; 39 ml in 1000 ml of water) the mixture is stirred for 15 minutes and the pH is brought to 6.5 with 10% HCl solution. After stirring for 15 minutes, 17.76 g of $AlCl_3 \times 6H_2O$ and 10.43 g of sodium sulfate are added in solid form. The suspension obtained is stirred at 95° C. for 1 hour. The aqueous solution is then filtered off with suction, the product is washed until free of chloride and dried. A portion of the product calcined at 850 ° C. for 0.5 hours.

22.5% by weight. In each case, the viscosity is set to a uniform value of 290±0.5 seconds in the DIN 4 efflux cup by means of fully demineralized water.

The pigmented dispersion varnishes are poured into 50 ml graduated cylinders. The sedimentation volume in ml is determined over a period of 30 days at the same times in each case.

TABLE 1

| Example | Pigment + | Coating | Sedimentation volume in ml after residence time (h) | | | | | | | | | |
|---|---|---|---|---|---|---|---|---|---|---|---|---|
| | | | 1 h | 2 h | 3 h | 5 h | 7 h | 1 d | 2 d | 5 d | 15 d | 30 d |
| | blank 1 = | Iriodin 123 (commercial product) | 50.0 | 49.9 | 49.8 | 49.3 | 49.2 | 45.0 | 38.0 | 21.0 | 19.1 | 19.1 |
| 3b) | blank 1 + | 2.5% of $SiO_2$/ 2.5% of $Al_2O_3$ | 50.0 | 49.9 | 49.8 | 49.3 | 49.2 | 47.3 | 42.2 | 30.2 | 22.3 | 22.2 |
| 3c) | blank 1 + | 5% of $SiO_2$/ 5% of $Al_2O_3$ | 50.0 | 49.9 | 49.8 | 49.4 | 49.3 | 48.2 | 46.2 | 40.0 | 25.8 | 25.5 |
| 4 | blank 2 = | preparation of Iriodin 123 + drying | 50.0 | 49.9 | 49.7 | 49.4 | 49.3 | 41.7 | 31.0 | 18.3 | 18.2 | 18.1 |
| 4b) | blank 2 + | 5% of $SiO_2$ without intermediate drying | 49.9 | 49.9 | 49.8 | 49.4 | 49.3 | 48.6 | 47.6 | 44.3 | 30.7 | 23.7 |
| 4c) | blank 2 + | 5 % of $SiO_2$/ 5% of $Al_2O_3$ without intermediate drying | 50.0 | 49.9 | 49.8 | 49.4 | 49.3 | 48.5 | 47.4 | 43.8 | 27.0 | 24.4 |
| 4 | blank 3 = | blank 2 + drying + ignition | 50.0 | 49.9 | 49.7 | 49.6 | 49.5 | 42.0 | 32.5 | 16.9 | 17.2 | 17.2 |
| 5 | blank 3 + | 5% of $SiO_2$/ 2.5% of $Al_2O_3$ without intermediate drying | 50.0 | 50.0 | 50.0 | 49.9 | 49.8 | 48.2 | 47.3 | 43.4 | 29.8 | 26.4 |

Example 6 a) Coating of mica with 1.3% of $SnO_2$ and 55.6% of $TiO_2$ 10 kg of F-mica (particle size 5–25 μm) in 200 l of fully demineralized water are heated to 75° C. At a pH of 1.8, first the $SnCl_4$ solution (30.6 g of $SnCl_4 \times 5H_2O$ and 2 l of concentrated HCl made up with fully demineralized water to 5.3 l) and stirred in for 40 min, followed by the addition of 34 l of $TiCl_4$ solution (388 g of $TiCl_4$/l of water).

The pH is kept constant with 32% strength sodium hydroxide solution.

b) Coating with 1% of $SiO_2$ and 1% of $Al_2O_3$ (1:1)

3250 ml of pigment suspension (corresponding to 200 g of pigment) are decanted once and then made up with 1800 ml of fully demineralized water (pigment concentration 10%). The pigment suspension is heated to 40 ° C. At a pH of 9.0, first sodium silicate solution (dilute with water in a ratio of 1:1; 10.8 ml made up with water to 300 ml) is added and stirred in for 0.5 h and then 9.47 g of $AlCl_3 \times 6H_2O$ are added in solid form. The mixture is heated to 75° C. and kept at that temperature for 75 min. The pH, which has dropped to 3.6, is gradually raised with 2.5% strength sodium hydroxide solution to pH 8, and the mixture is subsequently stirred at 75° C. for a further 1 h. The worked-up pigment is dried at 140° C. and then calcined at 850° C. for 0.5 h, Settling and redispersion experiments I. Sedimentation volume, pin test and spatula sample The recoated pigments and the corresponding reference pigment (blank pigment) are incorporated in the commercial dispersion varnish from Siegwerke Druckfarben by means of a propeller stirrer. The pigment concentration is about Using a special measuring pin, the penetration depth in the sediment in mm is determined on day 30. The greater the penetration depth, the softer the sediment.

Redispersibility of the sediments of the pigmented varnishes is evaluated by means of a spatula sample.

The coloristic values were determined using a Johnek Reilhofer instrument.

The gloss value is calculated from the lightness values (L values) of the measured geometries 22.5°/22.5° and 45°/0° of the drawbar paint film specimens by the following formula:

$$\text{Gloss value} = \frac{L_{22.5°/22.5°} - L_{45°/0°}}{L_{22.5°/22.5°}} \times 100$$

TABLE 2

| Example | Pigment | Sedimentation volume after 30 days in ml | Penetration depth of the pin after 30 days in mm | Redispersibility of the spatula sample after 30 days | Gloss value of drawbar paint film specimens (% by wt. of pigment in the coating) 1.7% | 22.5% |
| --- | --- | --- | --- | --- | --- | --- |
| — | blank 1; Iriodin 123 calcined | 19.1 | 50.0 | easy | 48.0 | 23.2 |
| 3b) | Iriodin 123 + 2.5% of $SiO_2$/ 2.5% of $Al_2O_3$ | 22.2 | 58.6 | easy to very easy | 50.1 | 21.9 |
| 3c) | Iriodin 123 + 5% of $SiO_2$/5% of $Al_2O_3$ | 25.5 | 67.3 | easy to very easy | 44.8 | — |
| 4 | blank 2; Iriodin 123 dried | 18.1 | 47.9 | medium to easy | 47.5 | 23.4 |
| 4b) | Iriodin 123 without drying + 5% of $SiO_2$ | 23.7 | 62.5 | easy to very easy | 49.5 | 17.1 |
| 4c) | Iriodin 123 without drying + 5% of $SiO_2$/5% of $Al_2O_3$ | 24.4 | 65.1 | easy to very easy | 50.0 | 22.2 |
| 4 | blank 3; Iriodin 123 calcined | 17.2 | 45.0 | medium to difficult | 45.3 | 22.3 |
| 5 | Iriodin 123 without drying + 5% of $SiO_2$/ 2.5% of $Al_2O_3$ | 26.4 | 69.0 | very easy | 49.5 | 15.6 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A surface-modified pigment comprising a layered silicate platelet-shaped substrate having thereon at least one metal oxide or metal hydroxide, wherein said pigment further comprises a an additional coating of a mixture comprising at least two metal oxides which are silica, alumina or zirconium dioxide, whereby said pigment settles to form a softer cake and redisperses easier in comparison to a pigment without said recoating.

2. A surface-modified pigment according to claim 1, wherein the amount of said mixture comprising at least two metal oxides is 0.3–50% by weight, relative to the total weight of said pigment.

3. A surface-modified pigment according to claim 1, wherein said at least two metal oxides of said mixture are silica and alumina.

4. A surface-modified pigment according to claim 1, wherein said at least two metal oxides is present in a weight ratio of 1:5 to 5:1.

5. A surface-modified pigment according to claim 1, wherein the platelet-shaped substrate having thereon at least one metal oxide or hydroxide is a mica flake coated with at least one metal oxide.

6. A pigment according to claim 1, wherein said at least two metal oxides of said mixture are $SiO_2$ and $Al_2O_3$ in a weight ratio of 1:5–5:1; $ZrO_2$ and $SiO_2$ in a weight ratio of 1:5–5:1; or $ZrO_2$ and $Al_2O_3$ in a weight ratio of 1:5–5:1.

7. A pigment according to claim 1, wherein said platelet-shaped substrate is mica, talc or kaolin.

8. A pigment according to claim 7, wherein said platelet-shaped substrate having thereon at least one metal oxide or metal hydroxide is mica coated with a colored or colorless metal oxide.

9. A pigment according to claim 8, wherein said platelet-shaped substrate having thereon at least one metal oxide or metal hydroxide is mica coated with $TiO_2$, $Fe_2O_3$, $SnO_2$, $Cr_2O_3$, ZnO or mixtures thereof.

10. A pigment according to claim 9, wherein said at least two metal oxides are silica and alumina.

11. A pigment according to claim 2, wherein the amount of said mixture comprising at least two metal oxides is 0.5–30% by weight.

12. A pigment according to claim 2, wherein the amount of said mixture comprising at least two metal oxides is 1–15% by weight.

13. A surface-modified pigment according to claim 1, wherein said at least two metal oxides are silica and zirconium dioxide.

14. A pigment according to claim 7, wherein said substrate is mica.

15. A pigment according to claim 7, wherein said substrate is talc.

16. A pigment according to claim 7, wherein said substrate is kaolin.

17. A paint, varnish, printing ink, plastic formulation or cosmetic preparation comprising the pigment of claim 1.

* * * * *